(12) United States Patent
Takano et al.

(10) Patent No.: US 11,062,846 B2
(45) Date of Patent: Jul. 13, 2021

(54) DIELECTRIC CERAMIC COMPOSITION, ELECTRONIC DEVICE, AND MULTILAYER CERAMIC CAPACITOR

(71) Applicant: TDK CORPORATION, Tokyo (JP)

(72) Inventors: Kosuke Takano, Tokyo (JP); Momoyo Sasaki, Tokyo (JP); Toshihiko Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/253,785

(22) Filed: Jan. 22, 2019

(65) Prior Publication Data

US 2019/0237256 A1    Aug. 1, 2019

(30) Foreign Application Priority Data

Jan. 31, 2018  (JP) .............................. JP2018-015877

(51) Int. Cl.
*C04B 35/468* (2006.01)
*H01G 4/12* (2006.01)
(Continued)

(52) U.S. Cl.
CPC ......... *H01G 4/1245* (2013.01); *C01G 23/006* (2013.01); *C04B 35/462* (2013.01); *C04B 35/4682* (2013.01); *C04B 35/638* (2013.01); *C04B 35/64* (2013.01); *H01B 3/12* (2013.01); *H01G 4/1218* (2013.01); *H01G 4/1227* (2013.01); *H01G 4/30* (2013.01); *C01P 2002/34* (2013.01); *C01P 2002/52* (2013.01); *C01P 2002/54* (2013.01); *C01P 2002/70* (2013.01); *C01P 2002/72* (2013.01); *C01P 2004/64* (2013.01); *C04B 2235/3205* (2013.01); *C04B 2235/3206* (2013.01); *C04B 2235/327* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3229* (2013.01); *C04B 2235/3236* (2013.01);
(Continued)

(58) Field of Classification Search
CPC .. C04B 35/4682; C04B 35/49; H01G 4/1227; H01G 4/1245
See application file for complete search history.

(56) References Cited

U.S. PATENT DOCUMENTS 5,296,425 A * 3/1994 Chazono ............... C04B 35/465
501/138
6,205,015 B1   3/2001 Wada et al.
(Continued)

FOREIGN PATENT DOCUMENTS

CN     1770341 A    5/2006
EP     1 832 563 A2  9/2007
(Continued)

*Primary Examiner* — Karl E Group
(74) *Attorney, Agent, or Firm* — Oliff PLC

(57) ABSTRACT

A dielectric ceramic composition includes a main component of a perovskite type compound represented by a general formula of $ABO_3$, in which A is an element in an A-site, B is an element in a B-site, and O is an oxygen element. A includes Ba. A further includes at least one of Ca and Sr. B includes Ti. A sintered-body lattice volume obtained by X-ray diffraction method is 64.33 $Å^3$ or below.

12 Claims, 7 Drawing Sheets

(51) Int. Cl.
  *H01G 4/30* (2006.01)
  *H01B 3/12* (2006.01)
  *C01G 23/00* (2006.01)
  *C04B 35/638* (2006.01)
  *C04B 35/64* (2006.01)
  *C04B 35/462* (2006.01)
  *H01G 4/008* (2006.01)
  *H01G 4/232* (2006.01)

(52) U.S. Cl.
  CPC ............... *C04B 2235/3239* (2013.01); *C04B 2235/3241* (2013.01); *C04B 2235/3244* (2013.01); *C04B 2235/3248* (2013.01); *C04B 2235/3262* (2013.01); *C04B 2235/3275* (2013.01); *C04B 2235/3279* (2013.01); *C04B 2235/5445* (2013.01); *C04B 2235/5454* (2013.01); *C04B 2235/6562* (2013.01); *C04B 2235/6565* (2013.01); *C04B 2235/6567* (2013.01); *C04B 2235/662* (2013.01); *C04B 2235/76* (2013.01); *C04B 2235/761* (2013.01); *C04B 2235/79* (2013.01); *H01G 4/0085* (2013.01); *H01G 4/232* (2013.01)

(56) References Cited

U.S. PATENT DOCUMENTS

| | | | |
|---|---|---|---|
| 6,291,380 B1* | 9/2001 | Yokoi | C04B 35/4682 361/321.4 |
| 6,310,761 B1 | 10/2001 | Hori et al. | |
| 7,718,560 B2* | 5/2010 | Yanagida | B82Y 30/00 501/139 |
| 7,943,542 B2* | 5/2011 | Umeda | C04B 35/49 501/139 |
| 8,771,631 B2* | 7/2014 | Nakagawa | H01G 4/1227 423/598 |
| 9,515,249 B2* | 12/2016 | Hayashi | C04B 35/4682 |
| 10,424,721 B2* | 9/2019 | Hayashi | C04B 35/6261 |
| 2003/0057405 A1* | 3/2003 | Matoba | C04B 35/4682 252/500 |
| 2006/0087796 A1 | 4/2006 | Yamazaki et al. | |
| 2007/0287625 A1* | 12/2007 | Yanagida | B82Y 30/00 501/138 |
| 2012/0075768 A1 | 3/2012 | Takeda et al. | |
| 2012/0216941 A1 | 8/2012 | Nakagawa et al. | |
| 2014/0009868 A1* | 1/2014 | Yamaguchi | C04B 35/4682 361/321.4 |
| 2019/0237256 A1* | 8/2019 | Takano | C01G 23/006 |
| 2019/0237257 A1* | 8/2019 | Takano | C01G 23/006 |

FOREIGN PATENT DOCUMENTS

| | | | |
|---|---|---|---|
| JP | 2001-143955 A | | 5/2001 |
| JP | 2006-089368 A | | 4/2006 |
| JP | 2009-035431 A | | 2/2009 |
| JP | 2011-042529 A | | 3/2011 |
| JP | 2012140258 A | * | 7/2012 |
| JP | 2012-176857 A | | 9/2012 |
| JP | 2017-108128 A | | 6/2017 |

* cited by examiner

DIELECTRIC CERAMIC COMPOSITION, ELECTRONIC DEVICE, AND MULTILAYER CERAMIC CAPACITOR

BACKGROUND OF THE INVENTION

The present invention relates to a dielectric ceramic composition and an electronic device utilizing the dielectric ceramic composition, particularly a multilayer ceramic capacitor.

Multilayer ceramic capacitors are reliable and inexpensive in cost and are hence used for many electronic devices. In particular, multilayer ceramic capacitors used for automobiles are recently required to have reliable dielectric layers.

In a conventional multilayer ceramic capacitor including dielectric layers composed of a dielectric ceramic composition whose main component is a perovskite type compound, oxygen defects tend to be generated in crystal grains of the dielectric ceramic composition. If an electric field is applied to this dielectric ceramic composition, the oxygen defects gradually move to a negative electrode. This causes degradation in reliability.

On the other hand, for example, Patent Document 1 discloses a technique of reducing variation in oxygen defect amount by controlling a distribution of additives in dielectric layers. In this case, however, a dielectric ceramic composition may vary in characteristics, and satisfactory reliability may not be obtained.

Various methods are studied for manufacturing a base material to be a raw material of a dielectric ceramic composition.

For example, Patent Document 2 discloses a technique of obtaining a base material by a solid phase method using raw materials of titanium oxide, calcium carbonate, and barium hydroxide.

Patent Document 3 discloses a technique of obtaining a dielectric ceramic composition with a raw material of a calcined material obtained by calcining barium titanate, rare earth oxides, calcium oxide, and magnesium oxide at 900 to 1100° C.

Patent Document 4 discloses a technique of obtaining barium calcium titanate by boiling barium titanate and calcium hydroxide while they are being stirred.

Patent Document 1: JP2017108128 (A)
Patent Document 2: JP2012176857 (A)
Patent Document 3: JP2001143955 (A)
Patent Document 4: JP2006089368 (A)

BRIEF SUMMARY OF INVENTION

It is an object of the invention to provide a dielectric ceramic composition and an electronic device utilizing the dielectric ceramic composition, particularly a multilayer ceramic capacitor.

The present inventors have earnestly studied to achieve the above object and obtained the present invention.

That is, a dielectric ceramic composition according to the present invention includes a main component of a perovskite type compound represented by a general formula of $ABO_3$, in which A is an element in an A-site, B is an element in a B-site, and O is an oxygen element, wherein
  A includes Ba,
  A further includes at least one of Ca and Sr,
  B includes Ti, and
  a sintered-body lattice volume obtained by X-ray diffraction method is 64.33 $Å^3$ or below.

The dielectric ceramic composition according to the present invention has a sintered-body lattice volume in a predetermined value or below and thereby demonstrates an effect on improvement in reliability.

Preferably, a sintered-body lattice volume obtained by X-ray diffraction method is 64.20 $Å^3$ or below.

Preferably, A of the dielectric ceramic composition includes Ca.

Preferably, a sintered-body lattice volume of the dielectric ceramic composition obtained by X-ray diffraction method is 63.55 $Å^3$ or above.

There is no limit to electronic devices according to the present invention as long as they have the above-mentioned dielectric ceramic composition. Examples of electronic devices according to the present invention include a multilayer ceramic capacitor where dielectric layers and inner electrode layers are laminated alternately.

DETAILED DESCRIPTION OF INVENTION

Hereinafter, the present invention is explained based on an embodiment shown in the figures.
Entire Structure of Multilayer Ceramic Capacitor FIG. 1 is a cross-sectional view of a multilayer ceramic capacitor 1 according to the present embodiment.

Figure 1:
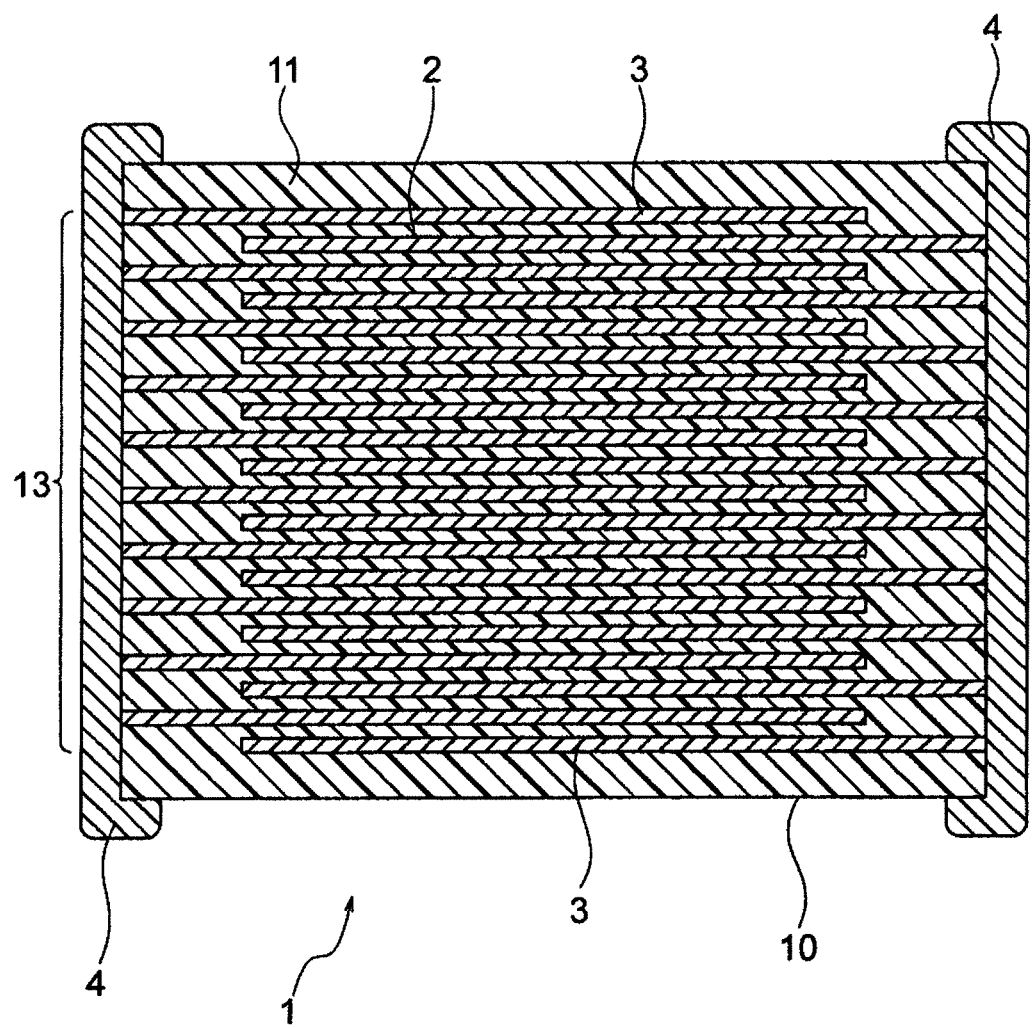
FIG. 1 is a cross-sectional view of a multilayer ceramic capacitor according to the present embodiment.
Figure 1:
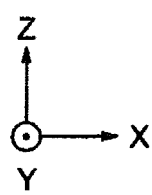

As shown in FIG. 1, the multilayer ceramic capacitor 1 according to the present embodiment includes a capacitor element body 10 having a structure where inner-layer dielectric layers 2 and internal electrode layers 3 are laminated alternately.

An inner-layer region 13 is a region where the inner-layer dielectric layers 2 and the internal electrode layers 3 are laminated alternately.

The capacitor element body 10 includes outer-layer regions 11 on both end surfaces in the lamination direction Z (Z-axis). The outer-layer regions 11 are formed by laminating a plurality of outer-layer dielectric layers that are thicker than the inner-layer dielectric layers 2 constituting the inner-layer region 13.

Hereinafter, the inner-layer dielectric layers 2 and the outer-layer dielectric layers may be referred to as dielectric layers as a whole.

Both ends of the capacitor element body 10 in the X-axis direction are provided with a pair of external electrodes 4 conductable with each of the internal electrode layers 3 alternately arranged in the capacitor element body 10. The capacitor element body 10 has any shape, but normally has a cuboid shape.

The inner-layer dielectric layers 2 have a thickness appropriately determined based on usage or so, and normally have a thickness of about 0.5 to 20 μm per one layer. Incidentally, the lamination number of the inner-layer dielectric layers 2 is normally about 2 to 1000.

The entire thickness of the outer-layer dielectric layers constituting the outer-layer region 11 is also appropriately determined based on usage or so, and is normally about 15 to 300 μm.

The internal electrode layers 3 are laminated so that each end surface of the internal electrode layers 3 is exposed alternately on surfaces of two ends of the capacitor element body 10 facing each other. The pair of external electrodes 4 is formed on both ends of the capacitor element body 10 and is connected to exposed end surfaces of the internal electrode layers 3 arranged alternately. Then, a capacitor circuit is formed.

A conductive material contained in the internal electrode layers 3 is not limited, but may be a base metal because the dielectric layers are made of a reduction resistant material. Preferably, the base metal as the conductive material is Ni or a Ni alloy. The Ni alloy is preferably an alloy of Ni and one or more elements selected from Mn, Cr, Co, and Al. Preferably, the Ni content of the alloy is 95 wt % or above. Incidentally, Ni or the Ni alloy may contain about 0.1 wt % or below of various fine components, such as P. The internal electrode layers 3 have a thickness appropriately determined based on usage or so.

The external electrodes 4 contain any conductive material, such as Ni, Cu, which are inexpensive, and an alloy of these elements, in the present embodiment. The external electrodes 4 have a thickness appropriately determined based on usage or so.

Dielectric Layers

The inner-layer dielectric layers 2 and the outer-layer dielectric layers constituting the outer-layer regions 11 may be made of the same material or different materials.

The dielectric layers are composed of the dielectric ceramic composition according to the present embodiment. The dielectric ceramic composition according to the present embodiment has a main component of a perovskite type compound represented by a general formula of $ABO_3$, where A is an element in an A-site, B is an element in a B-site, and O is an oxygen element.

In the dielectric ceramic composition according to the present embodiment, the A-site contains Ba and further contains at least one of Ca and Sr. This improves reliability.

When the total of Ba, Ca, and Sr in the dielectric ceramic composition according to the present embodiment is 100 parts by mol, 99 parts by mol to 90 parts by mol of Ba are preferably contained, more preferably 95 parts by mol to 90 parts by mol, in the dielectric ceramic composition.

Preferably, Ca or Sr is contained in the dielectric ceramic composition so that a ratio of (Ba+Ca+Sr)/(Ti+Zr) is 1. This easily enables a lattice volume of a sintered body to be a predetermined value or below.

Incidentally, Ca is preferably contained in the A-site. This can further improve high-temperature load life (HALT).

In the dielectric ceramic composition according to the present embodiment, Ti is contained in the B-site. This easily enables a lattice volume of a sintered body to be a predetermined value or below.

Zr and Hf may further be contained in the B-site. Hf is an element accompanying Zr. Preferably, Hf is 0.10 parts by mol to 2.00 parts by mol with respect to 100 parts by mol of the total of Zr and Hf.

When the total of Ti, Zr, and Hf in the dielectric ceramic composition according to the present embodiment is 100 parts by mol, 100 parts by mol to 95 parts by mol of Ti is preferably contained, more preferably 100 parts by mol to 99 parts by mol, in the dielectric ceramic composition.

Preferably, Zr and Hf are contained in the dielectric ceramic composition so that a ratio of (Ba+Ca+Sr)/(Ti+Zr) is 1. This easily enables a lattice volume of a sintered body to be a predetermined value or below.

In the dielectric ceramic composition constituting the inner-layer dielectric layers 2 of the present embodiment, a lattice volume of a sintered body obtained by X-ray diffraction method (hereinafter referred to as a "sintered-body lattice volume") is 64.33 Å$^3$ or below. This improves reliability. Incidentally, "reliability" means a low failure rate.

From the above aspect, a sintered-body lattice volume of the dielectric ceramic composition constituting the inner-layer dielectric layers 2 obtained by X-ray diffraction method is preferably 64.20 Å$^3$ or below, more preferably 63.55 Å$^3$ or above.

Incidentally, the outer-layer dielectric layers have any sintered-body lattice volume, but a sintered-body lattice volume of the dielectric ceramic composition constituting the outer-layer dielectric layers obtained by X-ray diffraction method is also 64.33 Å$^3$ or below, preferably 64.20 Å$^3$ or below, more preferably 63.55 Å$^3$ or above.

A sintered-body lattice volume of the present embodiment is obtained by the following method.

Initially, the external electrodes 4 are removed from the multilayer ceramic capacitor 1. A plurality of capacitor element bodies 10 thus obtained gets embedded into a resin 30 so that the X-Y planes of the capacitor element bodies 10 are exposed.

Figure 2A:
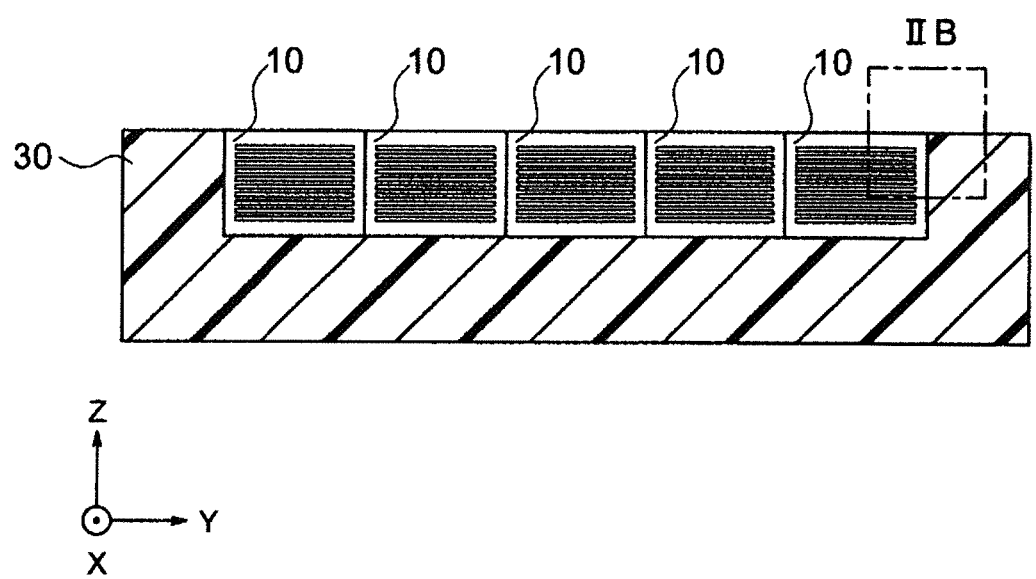
FIG. 2A is a cross-sectional view illustrating a measurement method for an X-ray diffraction of a sintered body of the present embodiment.
Figure 2B:
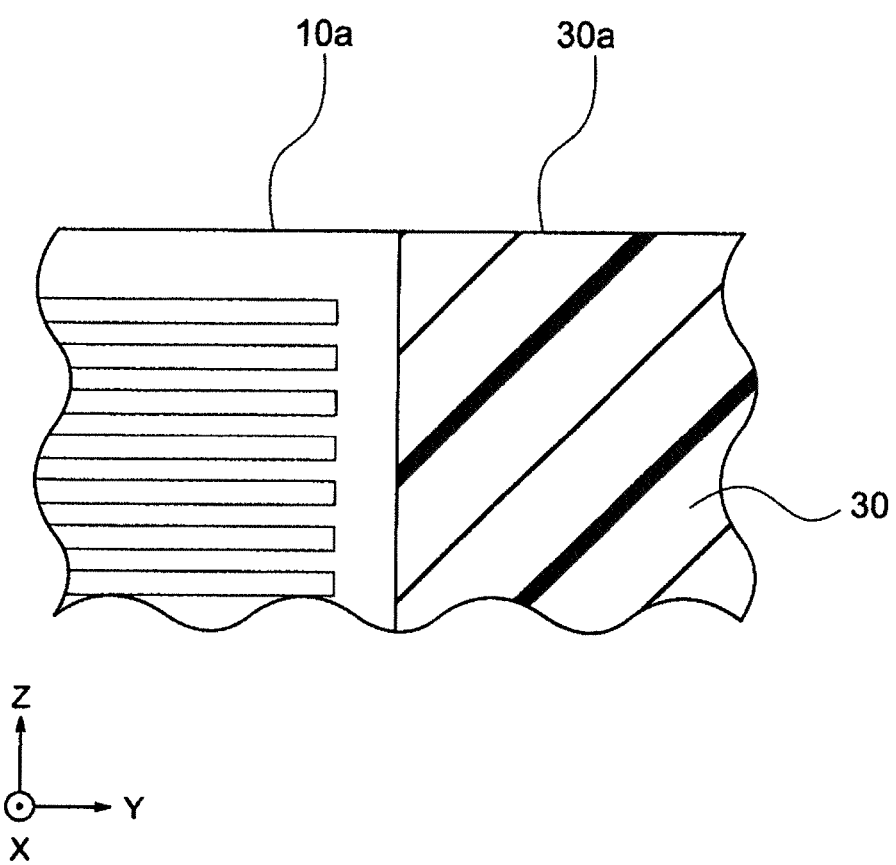
FIG. 2B is a cross-sectional view illustrating a measurement method for an X-ray diffraction of a sintered body of the present embodiment and is an enlarged cross-sectional view of IIB part shown in FIG. 2A.

Next, a top surface 10a (outer-layer region 11) of the capacitor element body 10 and a top surface 30a of the resin 30 undergo a mirror polish, and a dielectric ceramic composition forming the outer-layer region 11 in the capacitor element body 10, that is, an X-ray diffraction measurement surface of a sintered body is obtained (FIG. 2A and FIG. 2B). Incidentally, FIG. 2B is an enlarged cross-sectional view of FIG. 2A.

Next, an X-ray diffraction measurement is carried out, and a volume per unit cell (lattice volume) is calculated by Rietveld Analysis.

Incidentally, the above-mentioned method is a measurement method provided that the inner-layer dielectric layers 2 and the outer-layer dielectric layers of the outer-layer regions 11 have the same base material. When the inner-layer dielectric layers 2 and the outer-layer dielectric layers have the same base material, the inner-layer dielectric layers 2 and the outer-layer dielectric layers have the same sintered-body lattice volume. Thus, the sintered-body lattice volume of the inner-layer dielectric layers 2 can be confirmed by measuring the sintered-body lattice volume of the outer-layer region 11 as described above.

When the inner-layer dielectric layers 2 and the outer-layer dielectric layers of the outer-layer region 11 have different base materials, however, an X-ray diffraction measurement surface of the inner-layer dielectric layers 2 is obtained by carrying out the mirror polish so as to expose the inner-layer dielectric layers 2 and undergoes an X-ray diffraction measurement, and a volume per unit cell (lattice volume) is calculated by Rietveld Analysis.

In the dielectric ceramic composition constituting the inner-layer dielectric layers 2 of the present embodiment, a lattice volume ratio (Y/X) of a sintered-body lattice volume (Y) to a lattice volume (X) of a base material (hereinafter referred to as a "base-material lattice volume") obtained by X-ray diffraction method is preferably 0.998 or above. This improves reliability.

The base-material lattice volume of the present embodiment is obtained by the following method.

Figure 3A:
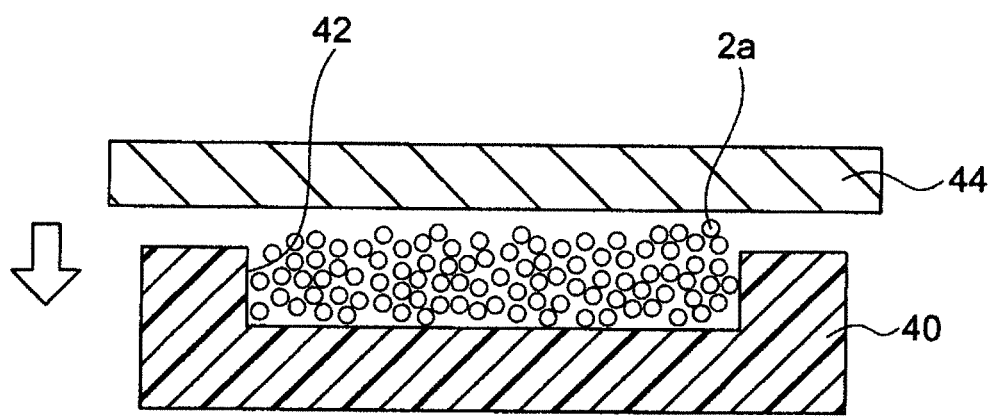
FIG. 3A is a cross-sectional view illustrating a measurement method for an X-ray diffraction of a base material of the present embodiment.

The base material is a material failing to contain a sub-component among dielectric raw materials before being pasted and turned into a paste for dielectric layers. This base material 2a is embedded into a cavity 42 of a die 40 and pressed in the arrow direction of FIG. 3A by a plate 44. At this time, a surface is manufactured as smoothly as possible.

Figure 3B:
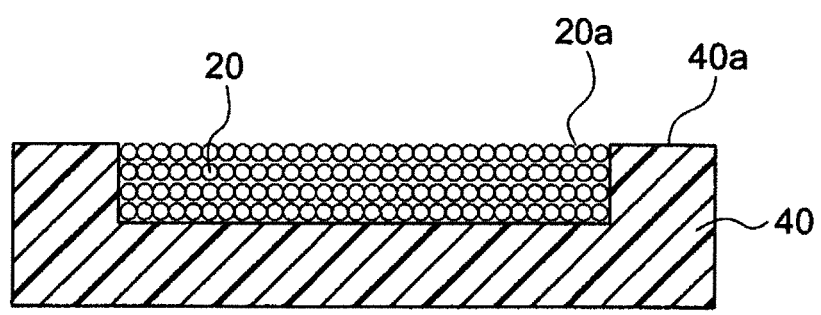
FIG. 3B is a cross-sectional view illustrating a measurement method for an X-ray diffraction of a base material of the present embodiment.

An X-ray diffraction measurement surfaces is obtained on a top surface 20a of the pressed base material and a top surface 40a of the die (FIG. 3B).

Next, an X-ray diffraction measurement is carried out, and a volume per unit cell (lattice volume) is calculated by Rietveld Analysis.

In the dielectric ceramic composition according to the present embodiment, the sintered-body lattice volume is a predetermined value or below. This is probably because Ba in the A-site is substituted by Ca or Sr, and Ti in the B-site is hardly substituted by Ca or Sr.

In a perovskite type compound represented by $ABO_3$, oxygen defects are considered to be generated if Ti, which is an element in the B-site, is substituted by Ca or Sr.

In the dielectric ceramic composition according to the present embodiment, however, it is considered that Ba in the A-site is substituted by Ca or Sr, and that Ti in the B-site is hardly substituted by Ca or Sr, as described above. Thus, oxygen defects can be prevented in the dielectric ceramic composition according to the present embodiment. As a result, a low failure rate and a favorable reliability are achieved in electronic devices using the dielectric ceramic composition according to the present embodiment.

In the main component of the dielectric ceramic composition according to the present embodiment, Ca or Sr is contained as an element in the A-site, and Ti in the B-site is hardly substituted by Ca or Sr, whereby the sintered-body lattice volume tends to be small.

Incidentally, the fact that Ca or Sr is contained as an element in the A-site and the fact that Ti in the B-site is not substituted by Ca or Sr are predictable by the fact that the sintered-body lattice volume is 64.33 $Å^3$ or below. This is because, since the ion radius of Sr and Ca is larger than that of Ti, the sintered-body lattice volume is 64.33 $Å^3$ or above if a Ti-site is substituted by Sr and Ca, or Sr or Ca. Incidentally, even if a Ba-site is substituted by most of Sr and Ca, or Sr or Ca, the Ti-site is substituted just by a tiny part of Sr and Ca, or Sr or Ca, and oxygen defects are generated. The generation of the oxygen defects can be confirmed by deterioration of evaluation result of reliability.

In addition to the above-mentioned main component, the dielectric layers of the present embodiment may further contain a sub-component. There is no limit to type or amount of the sub-component, but the following first to fifth sub-components may be employed, for example.

The first sub-component includes an oxide of at least one element selected from Mn, Cr, Co, Ni, and Fe.

The second sub-component may include an oxide of at least one element selected from V, Mo, and W.

The third sub-component includes an R oxide (R is at least one of Sc, Y, La, Ce, Pr, Nd, Pm, Sm, Eu, Gd, Tb, Dy, Ho, Er, Tm, Yb, and Lu).

The fourth sub-component includes an oxide of Mg.

The fifth sub-component includes an oxide of at least one element selected from Si, Li, Al, Ge, Ba, Ca, and B.

Method of Manufacturing Multilayer Ceramic Capacitor 1

Similarly to conventional multilayer ceramic capacitors, the multilayer ceramic capacitor 1 according to the present embodiment is manufactured by manufacturing green chips with an ordinary printing method or sheet method using a paste, firing them, printing or transcribing an external electrode thereon, and firing them. Hereinafter, a method of manufacturing the multilayer ceramic capacitor 1 is specifically explained.

Initially, $ABO_3$ to be a base material is prepared.

Preferably, a barium titanate is prepared as a raw material of Ti and Ba. In the barium titanate, a molar ratio of Ba/Ti is preferably less than 1. This easily enables Ca or Sr to enter the A-site of $ABO_3$. From the above aspect, a molar ratio of Ba/Ti of the barium titanate is preferably 0.900 to 0.990.

In addition to a so-called solid phase method, the base material is manufactured by various methods, such as various liquid phase methods (e.g., oxalate method, hydrothermal synthesis method, alkoxide method, sol gel method).

For example, when the base material is manufactured by a solid phase method, the base material is manufactured in the following manner.

In addition to the barium titanate, the raw material of Ca is preferably calcium carbonate, the raw material of Sr is preferably strontium carbonate, and the raw material of Zr (Hf may be contained) is preferably zirconium oxide.

The barium titanate, the raw material of Ca, the raw material of Sr, and the raw material of Zr (Hf may be contained) are dispersed in a water solution so that (Ba+Ca+Sr)/(Ti+Zr+Hf) is 1. Then, a preliminary slurry is obtained.

Next, the preliminary slurry is dispersed at an ordinary temperature in a ball mill, and a mixed slurry is obtained.

The mixed slurry is dried and turned into a dry powder. Preferably, the dry powder is calcined at a temperature of 800° C. to 1200° C. Then, a base material is obtained.

When the base material is manufactured by a liquid phase method, the base material is manufactured in the following manner.

In addition to the barium titanate, the raw material of Ca is preferably calcium hydroxide, the raw material of Sr is preferably strontium hydroxide, and the raw material of Zr (Hf may be contained) is preferably zirconium oxide.

The barium titanate is dispersed in a water solution, and the water solution is adjusted to have a pH of 10.0 to 14.0. At this time, sodium hydroxide is preferably used as a pH regulator. To prevent deposition of carbonate, the dispersion of the barium titanate is carried out during nitrogen substitution. Then, a preliminary slurry is obtained.

Next, the preliminary slurry with the adjusted pH is added with raw materials of Ca, Sr, and Zr (Hf may be contained) dissolved or dispersed in water beforehand so that (Ba+Ca+Sr)/(Ti+Zr+Hf) is 1. Then, the preliminary slurry is dispersed by a mixer, and a mixed slurry is obtained.

Next, the mixed slurry is preferably synthesized at a reaction temperature of 200° C. to 400° C. using an autoclave reactor. Then, a mixed slurry after the synthesization is obtained.

Next, the mixed slurry is filtered, and a resulting solid substance is preferably dried at 50° C. to 300° C. Then, a base material is obtained.

When the base material manufactured by the above-mentioned manner is used, the sintered-body lattice volume can be a predetermined value or below, and reliability tends to be favorable.

Prepared is a paste for dielectric layers containing the base material thus obtained and the dielectric raw material constituted by the above sub-components. Preferably, the above sub-components are added at this stage along with the base material thus manufactured. This enables the sintered-body lattice volume to be a predetermined value or below, and reliability tends to be favorable.

The amount of each compound in the dielectric raw material is determined so that the composition of the dielectric ceramic composition is obtained after firing. Before being turned into a paint, the dielectric raw material normally has an average grain size of about 0.02 to 1 μm.

The paste for dielectric layers may be an organic based paint where the dielectric raw material and an organic vehicle are kneaded or may be a water based paint.

The organic vehicle is a vehicle where a binder is dissolved in an organic solvent. The binder of the organic vehicle is appropriately selected from any normal binders, such as ethyl cellulose and polyvinyl butyral. The organic solvent of the organic vehicle is also appropriately selected from any organic solvents, such as terpineol, butyl carbitol, acetone, and toluene, based on an employed method of printing method, sheet method, or so.

When the paste for dielectric layers is a water based paint, kneaded are the dielectric raw material and a water based vehicle where a water-soluble binder, a dispersant, and the like are dissolved in water. The water-soluble binder used for the water based vehicle is not limited, and is polyvinyl alcohol, cellulose, water-soluble acrylic resin, or the like.

A paste for inner electrode layers is prepared by kneading the above-mentioned organic vehicle and a conductive material composed of the above-mentioned various conductive metals or an alloy. Instead of the conductive material, an oxide, an organic metal compound, a resinate, or the like may be used. The oxide, the organic metal compound, the resinate become the above-mentioned conductive material after being fired. The paste for inner electrode layers may contain a common material. The common material is not limited, but preferably has a composition that is similar to the composition of the main component.

A paste for external electrodes is prepared in a similar manner to the above-mentioned paste for inner electrode layers.

The organic vehicle content of each paste mentioned above is not limited and may be a normal content (e.g., binder: 1 to 5 wt %, solvent: 10 to 50 wt %). If necessary, each paste may contain additives selected from dispersant, plasticizer, dielectric, insulator, and the like. Preferably, the total amount of these is 10 wt % or below.

When a printing method is employed, the paste for dielectric layers and the paste for inner electrode layers are printed and laminated on a substrate of PET or so and are cut into a predetermined shape and peeled from the substrate. Then, green chips are obtained.

When a sheet method is employed, green sheets are formed using the paste for dielectric layers, and an inner electrode pattern is formed by printing the paste for inner electrode layers on the green sheets. Then, the green sheets with the inner electrode pattern are laminated, and green chips are obtained.

Before being fired, the green chips undergo a debinding treatment. As debinding conditions, a heating rate is preferably 5 to 300° C./hour, a holding temperature is preferably 180 to 400° C., and a temperature holding time is preferably 0.5 to 24 hours. The debinding atmosphere is an air or a reducing atmosphere.

After the debinding treatment, the green chips are fired. In the firing, a heating rate is preferably 100 to 500° C./hour. The holding temperature of the firing is preferably 1300° C. or below, more preferably 1150 to 1280° C., and the holding time is preferably 0.5 to 8 hours, more preferably 2 to 3 hours. When the holding temperature is lower than the above range, densification is insufficient. When the holding temperature is higher than the above range, easily generated are the disconnection of electrodes by abnormal sintering of the inner electrode layers 3, the deterioration of capacitance temperature characteristics by diffusion of constitutional materials of the inner electrode layers 3, and the reduction of the dielectric ceramic composition.

The firing atmosphere is preferably a reducing atmosphere. For example, the atmosphere gas is a humidified mixed gas of $N_2$ and $H_2$.

A partial pressure of oxygen during firing is appropriately determined based on the type of the conductive material of the paste for inner electrode layers. When the conductive material is a base metal of Ni, Ni alloy, etc., the partial pressure of oxygen in the firing atmosphere is preferably $10^{-14}$ to $10^{-10}$ MPa. When the partial pressure of oxygen is lower than the above range, the conductive material of the inner electrode layers 3 is abnormally sintered and may be disconnected. When the partial pressure of oxygen is higher than the above range, the inner electrode layers 3 tend to be oxidized. Preferably, the cooling rate is 50 to 500° C./hour.

After the firing in the reducing atmosphere, the capacitor element body is preferably annealed. The annealing is a treatment for re-oxidation of dielectric layers and remarkably increases IR lifetime (lifetime of insulation resistance). Thus, reliability is improved.

Preferably, the partial pressure of oxygen in the annealing atmosphere is $10^{-9}$ to $10^{-5}$ MPa. When the partial pressure of oxygen is lower than the above range, the re-oxidation of dielectric layers is difficult. When the partial pressure of oxygen is higher than the above range, the oxidation of the inner electrode layers 3 tends to progress.

The holding temperature during the annealing is preferably 1100° C. or below, particularly 1000 to 1100° C. When the holding temperature is lower than the above range, the oxidation of dielectric layers is insufficient, and this easily causes decrease in IR and IR lifetime. On the other hand, when the holding temperature is higher than the above range, capacitance is decreased by oxidation of the inner electrode layers 3, and the inner electrode layers 3 react with a dielectric base. This easily causes deterioration in capacitance temperature characteristics and decrease in IR and IR lifetime. Incidentally, the annealing may consist of only heating step and cooling step. That is, the temperature holding time may be zero. In this case, the holding temperature is equal to a maximum temperature.

In terms of the other annealing conditions, the temperature holding time is preferably 0 to 20 hours (more preferably 2 to 4 hours), and the cooling rate is preferably 50 to 500° C./hour (more preferably 100 to 300° C./hour). The atmosphere gas of the annealing is preferably a humidified $N_2$ gas or so.

To humidify a $N_2$ gas, a mixed gas, etc., for example, a wetter is used in the above-mentioned debinding treatment, firing, and annealing. In this case, the water temperature is preferably about 5 to 75° C.

The dedinbing treatment, the firing, and the annealing may be carried out continuously or independently.

The capacitor element body obtained as described above undergoes an end surface polish by barrel polish, sandblasting, etc. and is applied with the paste for external electrodes and fired. Then, the external electrodes 4 are formed. If necessary, a cover layer is formed on the surfaces of the external electrodes 4 by plating or so.

The multilayer ceramic capacitor 1 of the present embodiment thus manufactured is mounted on a print board by soldering or so and is used for various electronic devices.

Hereinbefore, an embodiment of the present invention is explained, but the present invention is not limited to the embodiment. Needless to say, various embodiments of the present invention can be carried out within a range where the scope of the present invention is not deviated.

For example, the above-mentioned embodiment illustrates a multilayer ceramic capacitor as an electronic device according to the present invention, but the electronic device according to the present invention is not limited to multilayer ceramic capacitors and may be any electronic device having the above-mentioned dielectric ceramic composition.

Examples

Hereinafter, the present invention is explained based on more detailed Examples, but is not limited thereto.
Sample No. 1 (Solid Phase Method)

A barium titanate powder (average SEM grain size: 20 nm, Ba/Ti: 0.990) was prepared.

The prepared barium titanate powder and a calcium carbonate were dispersed in a water solution, and a preliminary slurry was obtained. The concentration of barium titanate of the preliminary slurry was 30 wt %. The calcium carbonate was added so that a molar ratio of Ca/Ti was 0.010.

The preliminary slurry was dispersed for 20 hours in a ball mill, and a mixed slurry was obtained.

The mixed slurry was dried for 10 hours at 100° C., and a dry powder was obtained.

The dry powder was calcined for 5 hours at 900° C., and a base material was obtained.

With respect to 100 parts by mol of $TiO_2$ of the base material, prepared were sub-components of 0.40 parts by mol of $Y_2O_3$, 0.60 parts by mol of $SiO_2$, 0.20 parts by mol of MnO, 1.70 parts by mol of MgO, and 0.05 parts by mol of $V_2O_5$. The base material and the sub-components were wet-mixed and pulverized for 10 hours in the ball mill and dried. Then, a dielectric raw material was obtained.

100 parts by weight of the dielectric raw material, 10 parts by weight of polyvinyl butyral resin, 5 parts by weight of dioctyl phthalate (DOP) as a plasticizer, and 100 parts by weight of alcohol as a solvent were mixed and turned into a paste in the ball mill. Then, a paste for dielectric layers was obtained.

44.6 parts by weight of Ni particles, 52 parts by weight of terpineol, 3 parts by weight of ethylcellulose, and 0.4 parts by weight of benzotriazole were kneaded by a triple roll mill and turned into a paste. Then, a paste for inner electrode layers was manufactured.

A green sheet was formed on a PET film using the paste for dielectric layer so that the thickness of the green sheet after drying was 3.0 µm. Next, an inner electrode layers was printed with a predetermined pattern on the green sheet using the paste for inner electrode layers, and the sheet was peeled from the PET film. Then, a green sheet having the inner electrode layer was manufactured.

A plurality of green sheets having the inner electrode layers was laminated, pressed, bonded, and turned into a green laminated body. Then, the green laminated body was cut into a predetermined size and turned into a green chip.

The green chip was debindered, fired, and annealed with the following conditions. Then, a capacitor element body was obtained.

The debinding conditions were heating rate: 25° C./hour, holding temperature: 260° C., temperature holding time: 8 hours, and atmosphere: air.

The firing conditions were heating rate: 200° C./hour, holding temperature: 1200° C., and holding time: 2 hours. The cooling rate was 200° C./hour. Incidentally, the atmosphere gas was a humidified mixed gas of $N_2+H_2$, and the partial pressure of oxygen was $10^{-12}$ MPa.

The annealing conditions were heating rate: 200° C./hour, holding temperature: 1000° C., temperature holding time: 2 hours, cooling rate: 200° C./hour, and atmosphere gas: humidified $N_2$ gas (partial pressure of oxygen: $10^{-7}$ MPa).

Incidentally, a wetter was used for humidification of the atmosphere gas during the firing and the annealing.

The end surfaces of the capacitor element body were polished by sandblast and applied with Cu as external electrodes. Then, a sample of a multilayer ceramic capacitor shown in FIG. 1 was obtained. The size of the capacitor sample was 3.2 mm×1.6 mm×0.6 mm. The thickness of the inner-layer dielectric layer was 2.5 µm. The thickness of the inner electrode layers was 1.1 µm. The number of inner-layer dielectric layers sandwiched by the inner electrode layers was four.

The base material and the capacitor sample underwent an X-ray diffraction measurement, and a volume per unit cell (lattice volume) was calculated by Rietveld Analysis.

An X'Pert Pro (X-ray (Cu-Kα ray) diffractor) made by PANalytical was used. In 2θ=20 to 100°, the X-ray generation condition was 45 kV-40 mA, the scan width was 0.033°, the scan speed was 0.13°/s, and the X-ray detection conditions were Ni filter: 10 µm, solar slit: 0.04 rad, divergence slit: ½°, mask: 10 mm, and anti-scatter slit: 1° on the incident side optical system and anti-scattering slit: 5.5 mm, solar slit: 0.04 rad, and Ni filter: 20 µm on the receiving side optical system.

Incidentally, the inner-layer dielectric layers and the outer-layer dielectric layers had the same base material, and a sintered-body lattice volume of the inner-layer dielectric layers was confirmed by measuring a sintered-body lattice volume of the outer layer region.

The obtained capacitor samples underwent measurements of reliability and high-temperature load life (HALT) in the following manners.

(Reliability)

3000 capacitor samples underwent a voltage application test of 12.6 V/µm at 125° C. for 3000 hours and were thereafter measured for failure rate.

(High-Temperature Load Life)

High-temperature load life of the capacitor samples was measured by measuring a lifetime while a DC voltage was being applied in an electric field of 12.6 V/µm at 180° C. In the present examples, the lifetime was defined as a time from the beginning of the application to the drop of insulation resistance by one digit. In the present examples, the above-mentioned evaluation was carried out for 20 capacitor samples, and it is considered that the average was a high-temperature load life.

TABLE 1

| Sample No. | A-site [part by mol] Ba | A-site [part by mol] Ca | A-site [part by mol] Sr | B-site [part by mol] Ti | B-site [part by mol] Zr (including Hf) | method of manufacturing base material | lattice volume [Å³] base material X | lattice volume [Å³] sintered body Y | lattice volume ratio Y/X | reliability | HALT [h] |
|---|---|---|---|---|---|---|---|---|---|---|---|
| 1 | 99 | 1 | — | 100 | — | solid phase method | 64.35 | 64.33 | 0.9997 | 0/3000 | 10 |
| 2 | 99 | 1 | — | 100 | — | liquid phase method | 64.35 | 64.31 | 0.9994 | 0/3000 | 10 |
| 3 | 98 | — | 2 | 100 | — | solid phase method | 64.33 | 64.30 | 0.9995 | 0/3000 | 10 |
| 5 | 98.5 | 0.5 | 1 | 100 | — | solid phase method | 64.34 | 64.32 | 0.9997 | 0/3000 | 10 |
| 6 | 97.5 | 2.5 | — | 99 | 1 | solid phase method | 64.35 | 64.30 | 0.9992 | 0/3000 | 11 |
| 7 | 96 | — | 4 | 99 | 1 | solid phase method | 64.34 | 64.32 | 0.9997 | 0/3000 | 10 |
| 8 | 95 | — | 5 | 100 | — | solid phase method | 64.19 | 64.16 | 0.9995 | 0/3000 | 13 |
| 9 | 93 | — | 7 | 99 | 1 | solid phase method | 64.21 | 64.16 | 0.9992 | 0/3000 | 14 |
| 10 | 97 | 3 | — | 100 | — | solid phase method | 64.20 | 64.12 | 0.9988 | 0/3000 | 18 |
| 11 | 96 | 4 | — | 99 | 1 | solid phase method | 64.25 | 64.19 | 0.9991 | 0/3000 | 18 |
| 12 | 96 | 1 | 3 | 100 | — | solid phase method | 64.22 | 64.20 | 0.9997 | 0/3000 | 17 |
| 13 | 95 | 3 | 2 | 99 | 1 | solid phase method | 64.22 | 64.17 | 0.9992 | 0/3000 | 19 |
| 14 | 90 | 10 | — | 100 | — | solid phase method | 63.57 | 63.55 | 0.9997 | 0/3000 | 22 |
| 21 | 97 | 3 | — | 100 | — | solid phase method A | 64.55 | 64.35 | 0.9969 | 40/3000 | 0.5 |
| 22 | 97 | 3 | — | 100 | — | solid phase method B | 64.53 | 64.36 | 0.9974 | 40/3000 | 0.5 |
| 23 | 97 | 3 | — | 100 | — | liquid phase method A | 64.51 | 64.35 | 0.9975 | 20/3000 | 1.0 |
| 24 | 97 | 3 | — | 100 | — | liquid phase method B | 64.54 | 64.36 | 0.9972 | 40/3000 | 0.5 |
| 25 | 97 | 3 | — | 100 | — | solid phase method C | 64.21 | 64.35 | 1.0022 | 70/3000 | 10.0 |
| 26 | 100 | | | 100 | | solid phase method | 64.38 | 64.37 | 1.000 | 60/3000 | 0.5 |
| 27 | | | 100 | 100 | | solid phase method | 59.55 | 59.54 | 1.000 | 60/3000 | 0.4 |
| 28 | | 100 | | 100 | | solid phase method | 55.94 | 55.93 | 1.000 | 70/3000 | 0.1 |
| 29 | 100 | | | | 100 | solid phase method | 73.72 | 73.71 | 1.000 | 5/3000 | 19 |
| 30 | | 50 | 50 | 100 | | solid phase method | 57.75 | 57.74 | 1.000 | 60/3000 | 0.3 |
| 31 | 50 | 50 | | | 100 | solid phase method | 81.73 | 81.72 | 1.000 | 55/3000 | 17 |

Sample No. 2 (Liquid Phase Method)

A barium titanate powder (average SEM grain size: 20 nm, Ba/Ti: 0.990) was prepared.

The prepared barium titanate powder was dispersed in a water solution, and this water solution was adjusted to have pH 12.5 using a pH regulator. Then, a preliminary slurry was obtained. The pH regulator was sodium hydroxide. To prevent deposition of sodium carbonate, the above-mentioned operation was carried out during nitrogen substitution. The concentration of barium titanate of the preliminary slurry was adjusted to 20 wt %.

The preliminary slurry with the adjusted pH was added with a water solution of calcium hydroxide dissolved or dispersed in water beforehand so that a molar ratio of Ca/Ti was 0.010. Then, the preliminary slurry was dispersed by a mixer, and a mixed slurry was obtained.

The mixed slurry was synthesized at 200° C. (reaction temperature) for 6 hours (reaction time) using an autoclave reactor, and a mixed slurry after the synthesization was obtained. Then, a solid substance obtained by filtering this mixed slurry was dried at 100° C. for 10 hours, and a base material was obtained.

Except for using the above-mentioned base material, capacitor samples were obtained, a base-material lattice volume and a sintered-body lattice volume were obtained, and reliability and high-temperature load life were measured in a similar manner to Sample No. 1. Table 1 shows the results.

Sample No. 3, Sample No. 5 to Sample No. 14, and Sample No. 26 to Sample No. 31

Except that the raw material content of Ca, the raw material content of Sr, and raw material content of Zr (including Hf) were changed so that a molar ratio of Ba, Ca, Sr, Ti, and Zr (including Hf) was one shown in Table 1, capacitor samples were obtained, a base-material lattice volume and a sintered-body lattice volume were obtained, and reliability and high-temperature load life were measured in a similar manner to Sample No. 1. Table 1 shows the results.

Incidentally, the raw material of Sr was strontium carbonate.

Figure 4A:
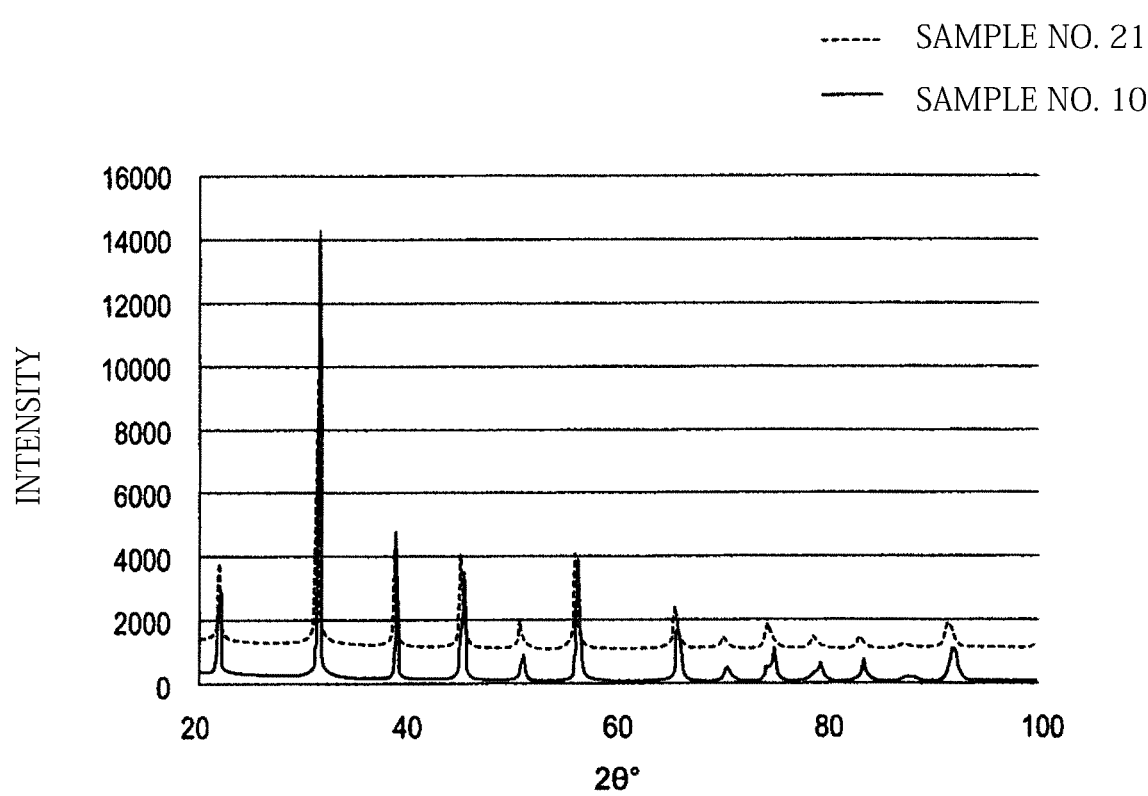
FIG. 4A illustrates XRD patterns of Sample No. 10 and Sample No. 21 of Examples.
Figure 4B:
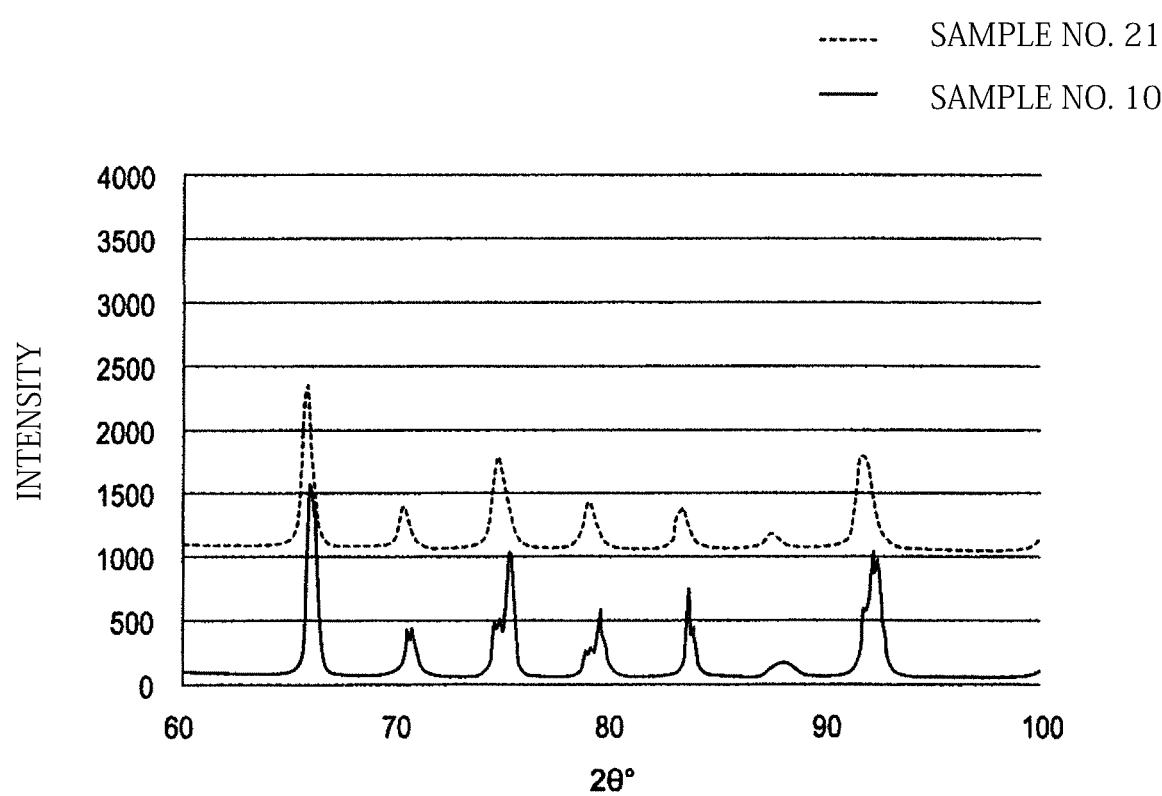
FIG. 4B illustrates XRD patterns of Sample No. 10 and Sample No. 21 of Examples.

An XRD pattern of Sample No. 10 is shown in FIG. 4A and FIG. 4B.

Sample No. 21 (Solid Phase Method A)

A raw material of barium carbonate, a raw material of calcium carbonate, and a raw material of titanium dioxide were prepared so that a molar ratio of (Ba+Ca)/Ti was 1.000 and that a molar ratio of Ca/Ti was 0.030.

The raw materials were dispersed in a water solution, and a preliminary slurry was obtained. The concentration of barium titanate of the preliminary slurry was 30 wt %.

The preliminary slurry was dispersed for 20 hours in a ball mill, and a mixed slurry was obtained.

The mixed slurry was dried for 10 hours at 100° C., and a dry powder was obtained.

The dry powder was calcined for 5 hours at 900° C., and a base material was obtained.

Except for using the above-mentioned base material, capacitor samples were obtained, a base-material lattice volume and a sintered-body lattice volume were obtained, and reliability and high-temperature load life were measured in a similar manner to Sample No. 1. Table 1 shows the results. An XRD pattern is shown in FIG. 4A and FIG. 4B.

Sample No. 22 (Solid Phase Method B)

A barium titanate powder (average SEM grain size: 20 nm, Ba/Ti: 0.970) was prepared.

The prepared barium titanate powder and calcium carbonate were dispersed in a water solution, and a preliminary slurry was obtained. The concentration of barium titanate of the preliminary slurry was 30 wt %, and calcium carbonate was added so that a molar ratio of Ca/Ti was 0.030.

The preliminary slurry was added with the sub-components described in Sample No. 1 so that the mixture ratio of Sample No. 1 was obtained, and the preliminary slurry added with the sub-components was dispersed for 20 hours in the ball mill. Then, a mixed slurry was obtained.

The mixed slurry was dried for 10 hours at 100° C., and a dry powder was obtained.

The dry powder was calcined for 5 hours at 900° C., and a base material was obtained.

Except for using the above-mentioned base material, capacitor samples were obtained, a base-material lattice volume and a sintered-body lattice volume were obtained, and reliability and high-temperature load life were measured in a similar manner to Sample No. 1. Table 1 shows the results.

Sample No. 23 (Liquid Phase Method A)

A barium titanate powder (average SEM grain size: 20 nm, Ba/Ti: 0.970) was obtained.

The barium titanate powder was dispersed in a water solution, and this water solution was adjusted to have pH 12.5 using a pH regulator. Then, a preliminary slurry was obtained. The pH regulator was barium hydroxide. To prevent deposition of barium carbonate, the above-mentioned operation was carried out during nitrogen substitution. The concentration of barium titanate of the preliminary slurry was adjusted to 20 wt %.

The preliminary slurry with the adjusted pH was added with a water solution of calcium hydroxide dissolved in water beforehand so that a molar ratio of Ca/Ti was 0.030. Then, the preliminary slurry was dispersed by a mixer, and a mixed slurry was obtained.

The mixed slurry was synthesized at 110° C. (reaction temperature) for 6 hours (reaction time) using an autoclave reactor, and a mixed slurry after the synthesization was obtained. Then, a solid substance obtained by filtering the reaction liquid was dried at 300° C. for 5 hours. Then, a base material was obtained.

Except for using the above-mentioned base material, capacitor samples were obtained, a base-material lattice volume and a sintered-body lattice volume were obtained, and reliability and high-temperature load life were measured in a similar manner to Sample No. 1. Table 1 shows the results.

Sample No. 24 (Liquid Phase Method B)

A raw material of barium hydroxide, a raw material of calcium hydroxide, and a raw material of titanium dioxide were prepared so that a molar ratio of (Ba+Ca)/Ti was 1.000, and that a molar ratio of Ca/Ti was 0.030.

The raw materials were dispersed in a water solution and adjusted to have pH 12.5 using a pH regulator, and a preliminary slurry was obtained. The pH regulator was barium hydroxide. The concentration of barium titanate of the preliminary slurry was adjusted to 20 wt %.

To prevent deposition of barium carbonate, the above-mentioned preliminary slurry was dispersed by a mixer during nitrogen substitution. Then, a mixed slurry was obtained.

The mixed slurry was synthesized at 200° C. (reaction temperature) for 6 hours (reaction time) using an autoclave reactor, and a mixed slurry after the synthesization was obtained. Then, a solid substance obtained by filtering the reaction liquid was dried at 100° C. for 10 hours, and a base material was obtained.

Except for using the above-mentioned base material, capacitor samples were obtained, a base-material lattice volume and a sintered-body lattice volume were obtained, and reliability and high-temperature load life were measured in a similar manner to Sample No. 1. Table 1 shows the results.

Sample No. 25 (Solid Phase Method C)

A raw material of calcium nitrate and a raw material of titanium dioxide were prepared so that a molar ratio of Ca/Ti was 0.030.

The raw materials were dispersed in a water solution, and this water solution was heated to 70° C. and added with a barium hydroxide powder so that a molar ratio of (Ba+Ca)/Ti was 1.000. Then, a preliminary slurry was obtained. To prevent deposition of barium carbonate, the preliminary slurry was heated for 1 hour at 85° C. during nitrogen substitution and was dispersed by a mixer. Then, a mixed slurry was obtained.

The mixed slurry was dried for 10 hours at 100° C., and a dry powder was obtained.

The dry powder was calcined for 5 hours at 1050° C., and a base material was obtained.

Except for using the above-mentioned base material, capacitor samples were obtained, a base-material lattice volume and a sintered-body lattice volume were obtained, and reliability was measured in a similar manner to Sample No. 1. Table 1 shows the results.

Table 1 shows that capacitor samples having a sintered-body lattice volume of 64.33 $Å^3$ or below (Sample No. 1 to Sample No. 3 and Sample No. 5 to Sample No. 14) had a favorable reliability compared to capacitor samples having a sintered-body lattice volume of larger than 64.33 $Å^3$ (Sample No. 21 to Sample No. 25).

Table 1 shows that capacitor samples failing to contain Ca or Sr (Sample No. 26 and Sample No. 29) did not have a sintered-body lattice volume of 64.33 $Å^3$ or below and tended to have a low reliability.

Table 1 shows that capacitor samples containing Ba (Sample No. 1 to Sample No. 3 and Sample No. 5 to Sample No. 14) had a favorable reliability and a favorable high-temperature load life compared to capacitor samples failing to contain Ba (Sample No. 27, Sample No. 28, and Sample No. 30).

Table 1 shows that capacitor samples failing to contain Ti (Sample No. 29 and Sample No. 31) did not have a sintered-body lattice volume of 64.33 $Å^3$ or below and tended to have a low reliability.

Table 1 shows that when the sintered-body lattice volume was 64.20 $Å^3$ or below, capacitor samples containing Ca (Sample No. 10 to Sample No. 14) had a favorable high-temperature load life compared to capacitor samples failing to contain Ca (Sample No. 8 and Sample No. 9).

In Sample No. 21, barium carbonate, calcium carbonate, and titanium dioxide were mixed and calcined, and it is thereby considered that barium titanate and calcium titanate were generated in addition to barium calcium titanate. In the method of manufacturing Sample No. 21, the generation ratio of barium titanate was high. Barium titanate normally has a sintered-body lattice volume of 64.38 $Å^3$ to 64.41 $Å^3$. It is thus considered that the sintered-body lattice volume of Sample No. 21 was larger than 64.33 $Å^3$.

In Sample No. 22, additives of MnO, $Y_2O_3$, $V_2O_5$, etc. were added to barium titanate along with calcium carbonate, and it is thereby considered that Ca was not sufficiently solid-soluted, and that Ti in the B-site was substituted by Ca as a result of competition with the additives. In Sample No. 22, it is consequently considered that the sintered-body lattice volume was larger than 64.33 $Å^3$.

In Sample No. 23, the reaction temperature was low, and it is thereby considered that Ca was not sufficiently solid-soluted. As a result, the sintered-body lattice volume measured in Sample No 23 mainly depended on the sintered-body lattice volume of barium titanate (64.38 $Å^3$ to 64.41

Å³), and the sintered-body lattice volume was thereby considered to be larger than 64.33 Å³.

In Sample No. 24, the base material was obtained by liquid phase method with barium hydroxide, calcium hydroxide, and titanium dioxide, and it is thereby considered that barium titanate and calcium titanate were generated in addition to barium calcium titanate. In the method of manufacturing Sample No. 24, the generation ratio of barium titanate was high. Barium titanate normally has a sintered-body lattice volume of 64.38 Å³ to 64.41 Å³. It is thus considered that the sintered-body lattice volume of Sample No. 24 was larger than 64.33 Å³.

In Sample No. 25, Ca and Ti were reacted in advance, and it is thereby considered that Ca could not be sufficiently solid-soluted in barium titanate. As a result, the sintered-body lattice volume mainly depended on the sintered-body lattice volume of barium titanate (64.38 Å³ to 64.41 Å³), and it is thereby considered that the sintered-body lattice volume was larger than 64.33 Å³.

NUMERICAL REFERENCES

1 . . . multilayer ceramic capacitor
10 . . . capacitor element body
10a . . . top surface of capacitor element body
11 . . . outer-layer region
13 . . . inner-layer region
2 . . . inner-layer dielectric layer
2a . . . base material
20a . . . top surface of pressed base material
3 . . . inner electrode layer
4 . . . external electrode
30 . . . resin
30a . . . top surface of resin
40 . . . die
40a . . . top surface of die
42 . . . cavity
44 . . . plate

What is claimed is:

1. A sintered dielectric ceramic composition comprising a main component of a perovskite type compound represented by a general formula of $ABO_3$, in which A is an element in an A-site, B is an element in a B-site, and O is an oxygen element, wherein A includes Ba,
A further includes at least one of Ca and Sr,
B includes Ti, and
a sintered-body lattice volume obtained by X-ray diffraction method is 64.33 Å³ or below.

2. The sintered dielectric ceramic composition according to claim 1, wherein a sintered-body lattice volume obtained by X-ray diffraction method is 64.20 Å³ or below.

3. The sintered dielectric ceramic composition according to claim 2, wherein A includes Ca.

4. The sintered dielectric ceramic composition according to claim 1, wherein a sintered-body lattice volume obtained by X-ray diffraction method is 63.55 Å³ or above.

5. An electronic device comprising the sintered dielectric ceramic composition according to claim 1.

6. A multilayer ceramic capacitor comprising a capacitor element body where inner-layer dielectric layers and inner electrode layers are laminated alternately,
wherein the inner-layer dielectric layers are composed of the sintered dielectric ceramic composition according to claim 1.

7. The sintered dielectric ceramic composition according to claim 1, wherein Ba is 99 parts by mol to 90 parts by mol with respect to 100 parts by mol of a total of Ba, Ca, and Sr.

8. The sintered dielectric ceramic composition according to claim 1, wherein Ba is 95 parts by mol to 90 parts by mol with respect to 100 parts by mol of a total of Ba, Ca, and Sr.

9. The sintered dielectric ceramic composition according to claim 1, wherein Zr and Hf are contained in the B-site, and Hf is 0.10 parts by mol to 2.00 parts by mol with respect to 100 parts by mol of the total of Zr and Hf.

10. The sintered dielectric ceramic composition according to claim 1, wherein when a total of Ti, Zr, and Hf in the dielectric ceramic composition is 100 parts by mol, 100 parts by mol to 95 parts by mol of Ti is contained in the dielectric ceramic composition.

11. The sintered dielectric ceramic composition according to claim 1, wherein when a total of Ti, Zr, and Hf in the dielectric ceramic composition is 100 parts by mol, 100 parts by mol to 99 parts by mol of Ti is contained in the dielectric ceramic composition.

12. The sintered dielectric ceramic composition according to claim 1, wherein Zr and Hf are contained in the dielectric ceramic composition so that a ratio of (Ba+Ca+Sr)/(Ti+Zr) is 1.

* * * * *